Figure 3:
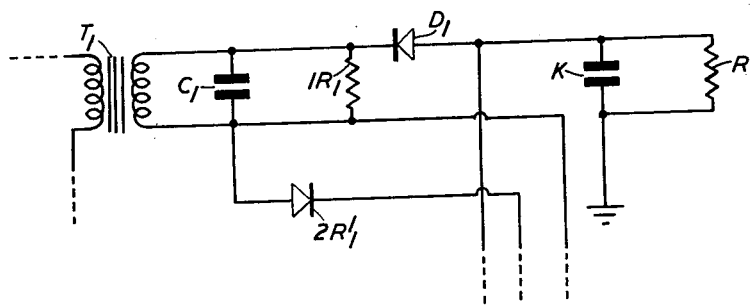

Sept. 19, 1961 R. H. BRITT 3,001,132
FREQUENCY MEASURING AND RESPONSIVE CIRCUIT ARRANGEMENTS
Filed July 31, 1958 2 Sheets-Sheet 1
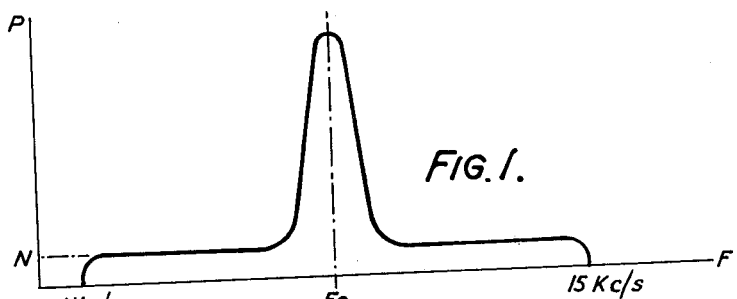
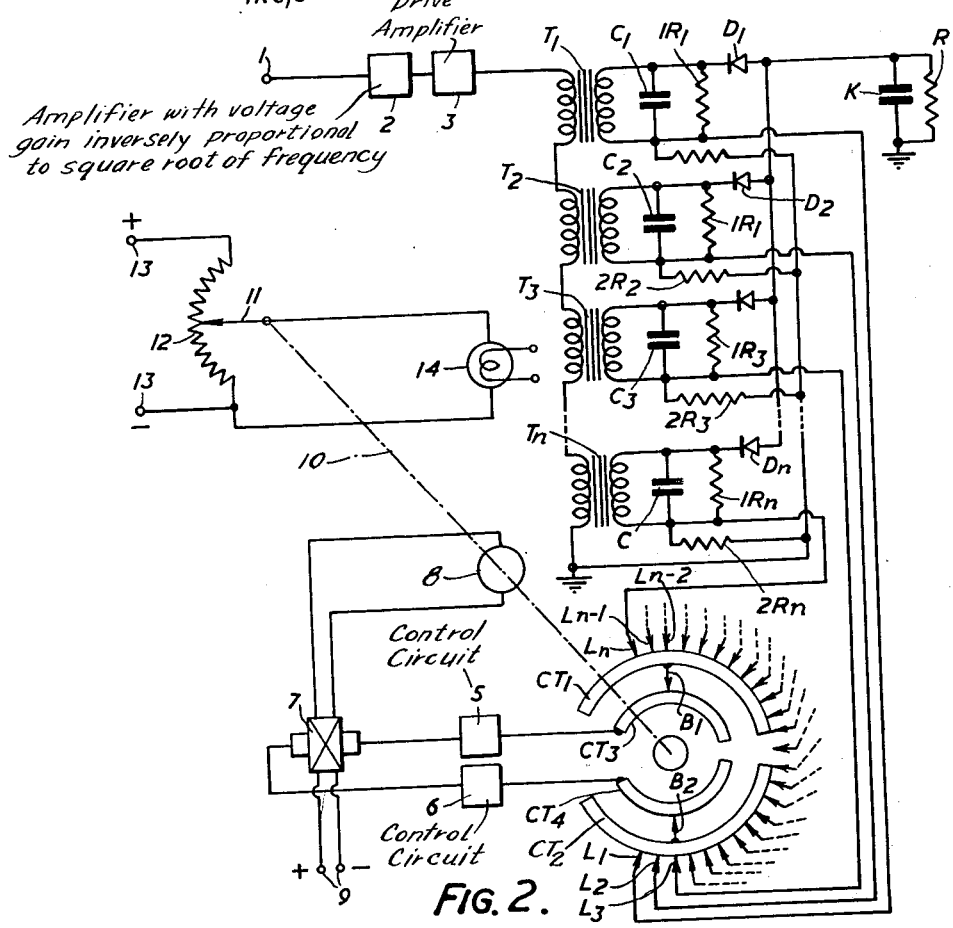
Inventor:
Ronald Howard Britt
By his attorneys:
Baldwin & Wight 3,001,132
FREQUENCY MEASURING AND RESPONSIVE
CIRCUIT ARRANGEMENTS
Ronald Howard Britt, Chelmsford, England, assignor to Marconi's Wireless Telegraph Company Limited, London, England, a company of Great Britain
Filed July 31, 1958, Ser. No. 752,287
Claims priority, application Great Britain July 1, 1958
10 Claims. (Cl. 324—77)

This invention relates to frequency measuring and responsive circuit arrangements and has for its object to provide improved and simple means for indicating or producing a response from the frequency of a signal which may be present in a predetermined band of frequencies.

Though not limited to its application thereto, the invention is primarily designed for, and is of especial advantage in, Doppler radar systems, that is to say, radar systems in which information is obtained by utilizing Doppler effect due to the relative movement of a radar system and a target with respect to one another. A type of such Doppler radar system to which the invention is particularly applicable is that type of system in which the speed and/or drift of an aircraft is ascertained by transmitting radio waves to the surface of the terrain over which the aircraft is moving and measuring the Doppler shift in the returned reflected waves to ascertain the aircraft's speed and/or drift. In this and in other types of Doppler radar system the measurement of the Doppler frequency is a matter of considerable difficulty and is commonly accomplished by measuring the frequency of a local oscillation generator which is adjusted to correspond with the Doppler frequency. In present practice the adjustment of the local oscillation generator—at leat the adjustment to approximate correspondence with the Doppler frequency—is effected manually. The present invention may be applied with considerable advantage to enable such approximate adjustment to be done entirely automatically.

According to this invention a device for ascertaining the frequency of a signal present in a predetermined band of frequencies comprises a plurality of narrow band resonators resonant at different frequencies within said band and between them substantially covering said band; a leaky condenser circuit; a plurality of rectifiers connected each between one side of said condenser circuit and one side of a different resonator; a plurality of output circuits each fed from a different resonator; means for feeding input signals to all the resonators, a variable group selector adapted, in each position of adjustment, to connect the output circuits in two groups, one consisting of output circuits (if any) appropriate to resonators resonant at frequencies on one side of one frequency and the other consisting of output circuits (if any) appropriate to resonators resonant at frequencies on the other side of said one frequency, said selector leaving unconnected the output circuit appropriate to the resonator which is resonant at said one frequency; and control means responsive to the signal present in whichever group includes that output circuit connected to that resonator which is predominantly responsive to the input signals for adjusting said selector until neither group includes that output circuit.

With this arrangement voltage built up across the leaky condenser will back off all the rectifiers connected thereto so that, if there is an incoming signal of such frequency as to make one of the resonators predominantly responsive, that resonator will feed (through its rectifier) into the condenser recurrent "pips" of current, thus raising the stored voltage in the condenser to a value sufficient to render all the other rectifiers non-conductive. In these conditions only one output circuit will carry any signal.

Preferably each output circuit is fed from the appropriate resonator by means including a non-linear element in circuit between said resonator and a point of fixed potential, voltage thus set up across said element being applied to said outputs circuit. A suitable non-linear element is a germanium or other semi-conductor diode which, in the early stages of forward conduction, obeys approximately the law $I=KE^5$ where I is the current passed, K is a constant and E is the voltage across the diode.

Preferably the variable group selector is constituted by a switch having a plurality of contacts one connected to each of said output circuits, and two spaced contactors movable together and adapted, in each position of adjustment of said switch, to leave one of said contacts unconnected and to connect together and to one contactor any contacts on one side of said one contact and to connect together and to the other contactor any contacts on the other side of said one contact; and control means responsive to whichever of said contactors carries the predominant signal for producing relative movement between said contactors and said contacts until neither contactor carries the predominant signal.

The control means may conveniently comprise relays actuating a reversing switch in the control circuit of an electric motor arranged to adjust the variable group selector.

The relays may be controlled each by a triggered circuit adapted to be triggered by the predominant signal into a condition in which it energizes its appropriate relay and to remain in that condition for a predetermined short period of time after each triggering. This however, is obviously not the only way of controlling the relays. For example in some cases it may be preferred for the relays to be controlled each by a D.C. amplifier of curtailed high frequency response. Owing to the pulsed nature of the inputs to these amplifiers—repeated "pips"—the stage of which each amplifier consists may be largely A.C. coupled, D.C. restoring clamp circuit means, as known per se.

In the most important application of the invention, which is to a Doppler radar, the input signals are signals in a predetermined Doppler band of frequencies and the variable group selector is ganged with the frequency control of a variable frequency oscillator calibrated to produce, at each position of adjustment effected by said selector, a frequency corresponding to that of the resonator producing the useful output signal.

The individual resonant frequencies of the resonators are preferably spaced logarithmically over the band covered thereby and preferably also each is of the same Q value so that the bandwidths covered by the individual resonators increase logarithmically with frequency. If this is done and the input signals are pre-amplified by an amplifier having a gain inversely proportional to the square root of frequency the resonators will respond equally in the absence of a signal in the predetermined band and in the presence of "white noise" only. By "white noise" is meant noise of substantially the same level over the whole band.

The invention is illustrated in and further explained in connection with the accompanying drawings, in which:

FIG. 1 is an explanatory graphical curve;
FIG. 2 is a diagram of one embodiment of the invention as applied to an aircraft speed or drift indicator of the Doppler radar type; and
FIG. 3 is a diagram illustrating a preferred modification of FIG. 2.

Referring to FIG. 1, this illustrates graphically the problem which the present invention is designed to solve.

In FIG. 1 the curve represents power per cycle P plotted as ordinates to an arbitrary scale against frequency F as abscissae. As will be seen the curve consists of a peak rising out of what may be termed a "plateau." The plateau is "white noise" of ordinate value N and may extend over a predetermined band exemplified as from 1 kc./s. to 15 kc./s. This would be the sort of band with which an aircraft speed or drift indicating Doppler radar system might have to deal, the Doppler frequency to be ascertained lying anywhere within this band. Arising up from the plateau is the peak which occurs at frequency $F_0$ and is the Doppler signal whose frequency is to be measured. To give a practical example, the width of this peak at half the peak amplitude might in practice be $\pm 0.05 F_0$. The requirement is to adjust automatically the frequency of a local frequency generator variable over the range 1–15 kc./s. (for example) so as to make it correspond at least approximately with the frequency of the signal $F_0$.

FIG. 2 shows diagrammatically an embodiment of the present invention which will solve the above problem.

Referring to FIG. 2, the whole band of frequencies within which the Doppler frequency $F_0$ may lie, is derived in any manner known per se. Since the apparatus for deriving the frequency $F_0$ is known and forms no part of the present invention, it is not described herein. The input signal band is applied at terminal 1 to an amplifier 2 of known form and having a voltage gain inversely proportional to the square root of the frequency. Output from the amplifier 2 is fed to a drive amplifier 3 of high output impedance which in turn feeds the series connected primaries of a number of transformers $T_1, T_2, T_3 \ldots T_n$. The number of transformers depends upon design requirements. The secondary of each transformer feeds a resonator constituted by a parallel tuned circuit $C_1, C_2, C_3 \ldots C_n$. All these tuned circuits have the same Q value and their resonant frequencies are spaced logarithmically, each tuned circuit being of a different resonant frequency and the said tuned circuits between them covering the whole band fed in from the amplifier 3. Each tuned circuit is connected to a rectifier $D_1, D_2, D_3 \ldots D_n$ and its resistance is represented by a resistance $1R_1, 1R_2, 1R_3 \ldots 1R_n$ which may be an actual resistance or may be merely inherent resistance. All the tuned circuits are connected through output resistances $2R_1, 2R_2, 2R_3 \ldots 2R_n$ to earth, and a storage condenser K shunted by a suitable resistance is connected between earth and those sides of all the diodes remote from their associated resonators.

The live sides of the output resistances $2R_1$ to $2R_n$ are connected as indicated to different fixed contacts $L_1$ to $L_n$ of a variable group selector constituted by a switch. This switch has two spaced moving arcuate contactors $CT_1$ and $CT_2$ which contact as shown with the contacts and each of which is connected to a fixed arcuate contactor $CT_3$ or $CT_4$ through a brush $B_1$ or $B_2$. The moving contactors can be rotated together by rotating shaft 10. It will be seen from the diagram that the moving contactors are so arranged that in any position one of the contacts $L_1$ to $L_n$ is left unconnected; all said contacts (if any) on one side of the unconnected contact are connected to the contactor $CT_1$; and all the remaining contacts $L_1$ to $L_n$ on the other side of the unconnected contact are connected to the contactor $CT_2$. The fixed contactors $CT_3, CT_4$ are connected to provide control of suitable circuits 5 and 6 for controlling the operating coils of a reversing relay switch generally designated 7. The circuits 5 and 6 may, for example, be bi-stable circuits as known per se, in which case the fixed contacts $CT_3$ and $CT_4$ are connected to the triggering circuits thereof. The circuits 5 and 6 may, however, be D.C. amplifiers of curtailed high frequency response. These amplifiers may be, as known per se, with largely A.C. coupled stages and provided with D.C. restoring clamp circuits, also as known per se. The means for curtailing high frequency may be simply a resistance-capacity circuit. Such curtailment has the effect of increasing the duration of the "pips" at the expense of amplitude, thus reducing the voltage handling requirements of the amplifier and averaging the "pip" signal over a period of a few milli-seconds. This averaging period is determined by the resistance-capacity time constant and may be of the same order as the operating time of the relay, or a little longer—for example from 5 to 50 milli-seconds.

The reversing relay switch 7, which supplies driving current to an electric motor 8 from a D.C. source connected at 9, is arranged in manner known per se with two operating coils. If neither of these coils is energized the switch is open; if one of them is energized the switch connects the motor 8 to the terminals 9 with one polarity; and if the other coil is energized the switch connects the motor 8 to the terminals 9 with the other polarity. The motor 8 is mechanically connected to the operating shaft 10 of the group selector switch so that rotation of the motor in one direction or the other rotates the contactors $CT_1$ and $CT_2$ in one direction or the other. The motor 8 also drives the slider 11 of a potentiometer whose resistance 12 is connected across a D.C. source at the terminals 13. This D.C. source drives through the potentiometer 11—12 the motor portion of a phonic wheel generator 14 represented conventionally and of the well known form consisting of an electric motor driving a toothed iron wheel, the teeth of which pass through a gap in the magnetic circuit of an inductive pick-up coil. The frequency of the generator 14 is therefore directly proportional to the speed at which the motor driven portion thereof rotates and this in turn is determined by the position of the slider 11 on the resistance 12.

The resonators with their associated rectifiers are so designed that in the presence of white noise alone they all respond equally. When, however, a signal such as that shown by the peak of FIG. 1 is added to the white noise, one (or possibly two) of the resonators will respond predominantly and its associated rectifier will feed "pips" of current into the condenser building up its voltage to a value at which all the other rectifiers are cut off and maintaining that voltage so long as the signal is present. Pips of voltage will therefore be fed to that one of the contacts $L_1$ to $L_n$ of the switch which is connected to the resonator in question. Provided that the said one contact is not the one which for the moment happens to be disconnected, the result will be that either the contactor $CT_1$ or the contactor $CT_2$ will carry a predominating signal, for, in the conditions stated, only that one contact has a signal at all. The predominating signal is used to cause the reversing switch to be closed in one direction or the other and the motor 8 to run in one direction or the other. This is done by the circuits 5 and 6 which, as already stated, might be known bi-stable circuits of the "flip-flop" type of D.C. amplifiers with curtailed high frequency response. If they are "flip-flop" circuits each is arranged to be triggered by the predominating signals from a normal stable condition to the other condition in which it energizes the appropriate relay winding of the reversing switch, automatically returning from said other condition after the expiration of a predetermined short time, e.g. half a second. If D.C. amplifiers are used they are employed to the relay windings of the reversing switch in obvious manner to produce the required operational result. Since both "flip-flop" circuits and D.C. amplifiers are well known per se the circuits 5 and 6 are not shown in detail but are represented merely by the blocks carrying the references 5 and 6. The motor drive to the selector switch is so arranged that on energization of the motor 8 it drives the said selector switch until the gap between the contactors $CT_1$ and $CT_2$ comes opposite the fixed contact which is carrying the predominating signal. In FIG. 2, in which there are twenty-five contacts shown (this by way of example only) the position of the selector switch is that which would finally be adopted if the central contact ($L_{13}$) were the one carrying the predominating signal. When the contact carrying this signal is disconnected by the selector switch, the reversing switch 7 opens circuit and the motor 8 stops. The motor 8 also drives the potentiometer 11—12 and this drive is so arranged and the generator 14 is so designed that when the motor 8 has adjusted the selector switch to that position in which the contact carrying the predominating signal is disconnected, the adjustment of the potentiometer and the speed of the generator 14 are such that the said generator produces an output frequency which corresponds to the resonant frequency of the resonator providing the said signal. Accordingly the selector switch will automatically move round until its position corresponds with the position of the frequency of a signal in the input signal band fed in at 1 and when it has done this the frequency of the generator 14 will correspond with that signal frequency and may be measured or utilized in any manner known per se.

FIG. 3 illustrates a preferred modification of the embodiment of FIG. 2. The modification consists in replacing each of the simple resistances $2R_1$, $2R_2$, $2R_3$ ... $2R_n$ of FIG. 2, and across which the output signals are built up, by a non-linear element—preferably a germanium or other semiconductor diode whose voltage (E) current (I) law approximates, in the early stages of forward conduction, to the equation $I=KE^5$ where K is a constant. FIG. 3 shows only one of the resonators of FIG. 2— the uppermost resonator of that figure—modified by replacing the simple resistance $2R_1$ by a germanium diode marked $2R_1$ in FIG. 3. It is, of course, to be understood that, in this modification, each of the resistances $2R_1$, $2R_2$ ... $2R_n$ is similarly replaced by a germanium diode but, for simplicity in drawing, FIG. 3 shows only the one circuit. Apart from the substitution of diodes for simple resistances as described, the remainder of the embodiment illustrated by FIG. 3 is as in FIG. 2.

I claim:

1. A device for ascertaining the frequency of a signal present in a predetermined band of frequencies, comprising a plurality of narrow band resonators resonant at different frequencies within a predetermined band of frequencies and between them substantially covering said band of frequencies; a leaky condenser circuit; a plurality of rectifiers connected each between one side of said condenser circuit and one side of a different resonator; a plurality of output circuits each fed from a different resonator; means for feeding input signals to all the resonators; a variable group selector, adapted in each position of adjustment, to connect the output circuits in two groups, one consisting of output circuits appropriate to resonators resonant at frequencies on one side of one frequency and the other consisting of output circuits appropriate to resonators resonant at frequencies on the other side of said one frequency, said selector leaving unconnected the output circuit appropriate to the resonator which is resonant at said one frequency; and control means responsive to the signals present in that group which includes that output circuit connected to that resonator which is predominately responsive to the input signals for adjusting said selector until neither group includes that output circuit.

2. A device as claimed in claim 1 wherein each output circuit is fed from the appropriate resonator by means including a non-linear element in circuit between said resonator and a point of fixed potential, and means whereby the voltage thus set up across said element is applied to said output circuit.

3. A device as claimed in claim 1 wherein each output circuit is fed from the appropriate resonator by means including a non-linear element in circuit between said resonator and a point of fixed potential, and means whereby the voltage thus set up across said element is applied to said output circuit, and wherein the non-linear element in each of the circuits are semi-conductor diodes.

4. A device as claimed in claim 1 wherein the variable group selector is constituted by a switch having a plurality of contacts, one connected to each of said output positions of adjustment of said switch, to leave one of said contacts unconnected, and to connect together, and to one contactor any contacts on one side of said one contact and to connect together, and to the other contactor, any contacts on the other side of said one contact; and control means responsive to whichever of said contactors carries the predominant signal for producing relative movement between said contactors, and said contacts, until neither contactor carries the predominant signal.

5. A device as claimed in claim 1 wherein the control means include relays actuating a reversing switch in the control circuit of an electric motor arranged to adjust the variable group selector.

6. A device as claimed in claim 1 wherein the control means include relays actuating a reversing switch in the control circuit of an electric motor arranged to adjust the variable group selector, and wherein the relays are controlled each by a triggered circuit adapted to be triggered by the predominant signal into a condition in which it energizes its appropriate relay and to remain in that condition for a predetermined short period of time after each triggering.

7. A device as claimed in claim 1 wherein the control means include relays actuating a reversing switch in the control circuit of an electric motor arranged to adjust the variable group selector, and wherein the relays are controlled each by a D.C. amplifier of curtailed high frequency response.

8. A device as claimed in claim 1 wherein the individual resonant frequencies of the resonators are spaced logarithmically over the band covered thereby.

9. A device as claimed in claim 1 wherein all the resonators are of substantially the same Q value and the input signals by an amplifier having a gain inversely proportional to the square root of frequency.

10. A Doppler radar system including a device as claimed in claim 1 and wherein the input signals are signals in a predetermined Doppler band of frequencies and the variable group selector is ganged with the frequency control of a variable frequency oscillator calibrated to produce, at each position of adjustment effected by said selector; a frequency corresponding to that of the resonator producing the useful output signal.

References Cited in the file of this patent

UNITED STATES PATENTS

| | | |
|---|---|---|
| 2,159,790 | Freystedt et al. | May 23, 1939 |
| 2,753,524 | Newsom | July 3, 1956 |

OTHER REFERENCES

"An Improved Low Frequency Analyzer," article in Electronic Engineering, November, 1943; pp. 236–239.